VIDEO AMPLIFIER

Filed Oct. 1, 1958

INVENTORS,
FRANK L. WEDIG
DONALD S. OLIVER
BY Hurwitz & Rose
ATTORNEY

United States Patent Office 3,003,114
Patented Oct. 3, 1961

3,003,114

VIDEO AMPLIFIER

Frank L. Wedig, Cincinnati, Ohio, and Donald S. Oliver, Scottsdale, Ariz., assignors to Avco Manufacturing Corporation, Cincinnati, Ohio, a corporation of Delaware Filed Oct. 1, 1958, Ser. No. 764,557
9 Claims. (Cl. 330—70)

Figure 1:
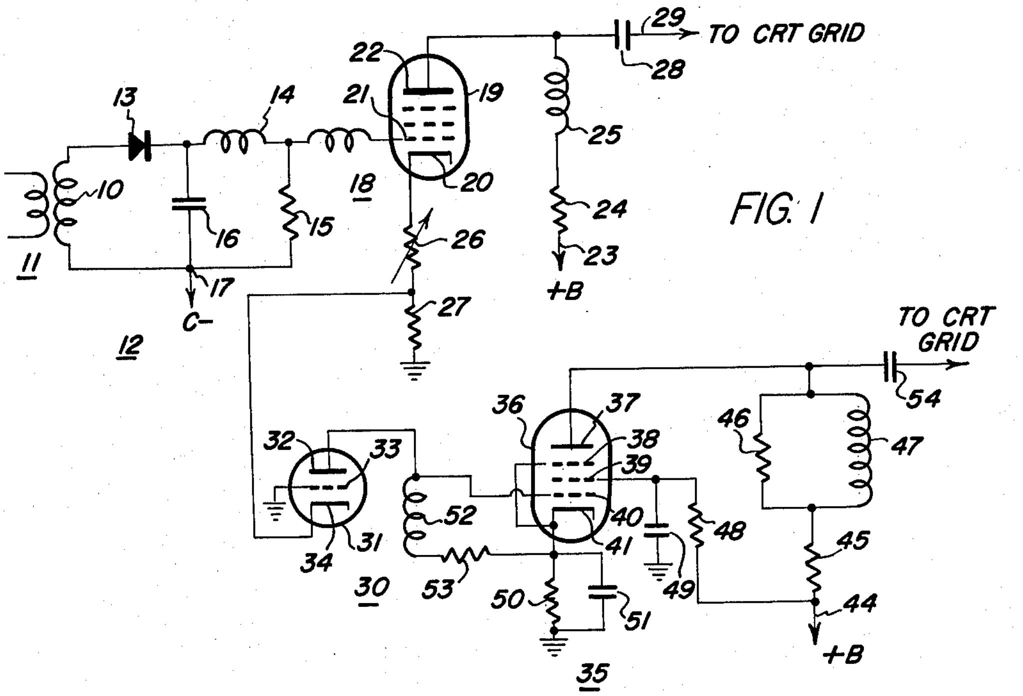

The present invention relates generally to wide band high gain amplifiers, and more particularly to video amplifiers arranged for supplying co-phasal video signals to plural relatively remote displays, and providing for controlling a common characteristic of the plural displays in response to a single control.

Briefly describing preferred embodiments of the inventions, which employ, respectively, vacuum tube amplifier elements and solid state amplifier elements, three stages are employed in cascade, of which the first stage presents high input impedance and low interstage output impedance, and introduces no interstage phase reversal of signal, the second stage presents low input impedance and high output impedance, introduces no phase reversal of signal and may provide considerable voltage and power gain, while the third stage presents high input impedance and high output impedance, introduces a phase reversal of signal and provides very high power and voltage gain. The amplifier stages are direct coupled throughout to provide low frequency response and the stages are impedance matched throughout for maximum transfer efficiency between stages. Only the last stage of the amplifier, considered as a three stage amplifier, provides phase reversal of signal, so that stability over a wide band of frequencies is attainable. Nevertheless, the cascaded stages have higher power gain (75–90 db) than is attainable in a single stage since the intermediate stage may have voltage and power gain concurrently with the ability to match the low output impedance of the first stage to the high input impedance of the last stage. Since, moreover, the first and last stages provide points at which co-phasal voltages may be derived, albeit of different gain and response characteristics, the utility of the amplifier includes applications wherein different gain and response characteristics are required at two locations, one of which may be remote from the other, but which may be controlled from a single control. Such an application might involve the provision of grid voltages to cathode ray devices, as in remote slaved displays, wherein contrast control for both displays may be effected by means of a single control device.

More specifically, one embodiment of the invention, employing vacuum tube amplifier devices, includes a video amplifier stage having a cathode follower output circuit, a grounded grid second stage direct coupled to the cathode follower, and an anode loaded grid driven third stage.

The anode of the second stage is connected in series with the cathode of the third stage via a load impedance, and is directly connected to the control grid of the third stage, so that a series path exists from a B+ terminal through both the third and second stage amplifier tubes in series, while the cathode load of the first stage provides driving signal and bias voltage for the cathode of the second, or grounded grid stage.

Since video signal may be derived, with high power gain, from the anode of the first stage, the system may be considered to consist of two video amplifier channels which may be driven from the cathode of another video amplifier. In such case, the last mentioned video amplifier may provide output video signal to a cathode ray tube in normal fashion, but also provides drive signal for the two stage video amplifier channel. The latter consists of a grounded grid triode first stage, in that embodiment which employs vacuum tubes as amplifying elements.

The cathode of the grounded grid stage may be directly coupled to the signal source, while its plate circuit is direct coupled to the grid of a pentode second stage amplifier. The triode first stage being a grounded grid amplifier the Miller effect common to the triode tube is eliminated, voltage and power gain is attainable, and in addition no phase reversal occurs in the stage. The cathode follower coupling system from the cathode of the video amplifier permits a contrast control circuit to be included in the video amplifier to function in its normal manner in respect to both amplifiers, and the outputs of both amplifiers are co-phasal. Thereby the system lends itself to supplying simultaneously controllable signal to two relatively remote cathode ray tube displays.

The first stage may, accordingly, be considered to be a driver for a further video amplifier or the first stage of a three stage amplifier capable of supplying co-phasal output video signal at both its first and third stages.

In a second embodiment of the invention solid state amplifying devices are employed throughout, one for each stage of the three stage amplifier. The last stage of the amplifier is base driven and includes a collector load and a grounded emitter. This stage provides high gain, and a phase reversal of signal between base and collector electrodes.

The second stage is operated with its base grounded through a capacitor for signal frequencies, is driven at its emitter and is provided with a collector load which is in series with the emitter of the third stage. The collector of the second stage is directly connected to the base of the third stage, so that signal across the second stage load drives the third stage co-phasally with the input to the second stage. The first stage is an emitter loaded, grounded collector stage driven at its base and has its emitter directly connected to the emitter of the second stage. Additionally, signal output may be derived from the collector of the first stage, which is co-phasal with the output of the third stage.

The second and third stages are operated in series, i.e., a D.C. circuit can be traced from the negative terminal of the power supply through the collector to emitter electrodes of the second stage, to the load for the first stage, and back to the positive or grounded terminal of the power supply.

It is, accordingly, a broad object of the present invention to provide a novel three-stage, direct-coupled amplifier having high input impedance and high gain, and which is capable of operating over a band of frequencies extending from essentially D.C. to the V.H.F. region.

It is a further object of the invention to provide a three-stage amplifier having two stages which provide gain, but having only a single phase reversal of signal between input and output terminals of the amplifier.

It is another object of the invention to provide a novel active circuit device for coupling a low impedance generator to a high impedance amplifier input circuit, wherein the device provides power gain without introducing phase reversal of signal.

A further object of the invention resides in the provision of a two-stage vacuum tube amplifier in which the source of anode voltage for the first stage is a self-bias circuit of the second stage.

Another object of the invention resides in the provision of a two stage amplifier in which the first stage is a cathode driven input circuit, and in which the second stage is a grid driven input circuit, a self-bias circuit for the second stage providing steady anode voltage for the first stage, and a load circuit for the first stage being connected between the first stage anode and the second stage cathode, the second stage grid deriving signal from the latter load circuit.

It is still another object of the present invention to provide a three stage amplifier having two relatively high level output terminals which provide co-phasal signals, and in which the total phase shift between the input of the amplifier and either output terminal is 180°.

It is a further object of the invention to provide a pair of amplifiers having simultaneously controllable gain, and co-phasal outputs, the amplifiers being coupled in cascade.

It is still another object of the invention to provide a multiple stage amplifier, having provision for deriving high level output of the same phase from two stages, wherein the latter stages may be coupled over a low impedance line.

Figure 2:
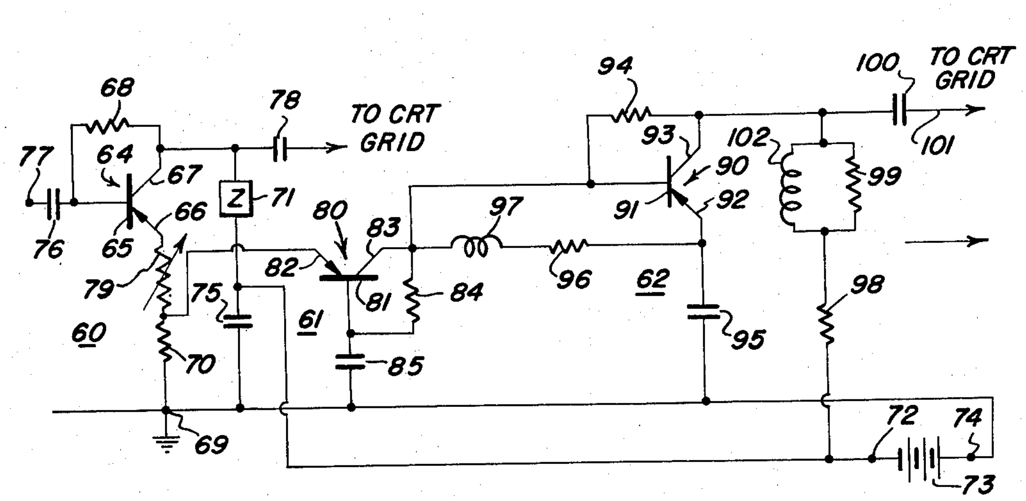

The above and still further objects, features and advantages of the present invention will become apparent upon consideration of the following detailed description of one specific embodiment thereof, especially when taken in conjunction with the accompanying drawings, wherein:

FIGURE 1 is a schematic circuit diagram of a system of amplification according to the present invention, which employs vacuum tube amplifying elements; and FIGURE 2 is a schematic circuit diagram of a modification of the system of FIGURE 1, employing solid state amplifier elements.

Proceeding now more particularly by reference to the accompanying drawings, the reference numeral 10 (FIGURE 1) denotes the secondary winding of an input transformer 11 of a video detector 12, to which may be applied, in any convenient manner, a carrier modulated by video signal. The secondary winding 10 is connected in series with a diode detector 13, an R.F. choke 14 and a load resistance 15. A carrier frequency by-pass condenser 16 is connected between the load side of the diode detector 13 and a point 17 at reference potential. The point 17 may be connected to a source of steady bias voltage, not shown, for application to the control grid of a succeeding video amplifier stage.

A first video amplifier stage 18 is provided, comprising a pentode vacuum tube 19 having a cathode 20, a control electrode 21, and the usual screen and suppressor grids. The latter are shown unconnected since their mode of association in the circuit does not pertain to the present invention. The pentode 19 further includes an anode 22, connected to a B+ terminal 23 via a resistance 24 and a choke 25, in series, the latter providing peaking at high video frequencies. The cathode 20 is connected to ground via a relatively large variable resistance 26 and a relatively small load resistance 27. Adjustment of the relatively large resistance 26 provides contrast control, where the system of the invention is utilized for supplying signal potential to the grid of a cathode ray tube, for example in television or radar display systems. Signal voltage may be derived from anode 22 via a blocking condenser 28 and applied to a load, as for example, the grid circuit of a cathode ray tube (not illustrated) via a lead 29.

A second stage 30 of the amplifier consists of a triode vacuum tube 31 having an anode 32, a control grid 33, and a cathode 34. The cathode 34 is connected via a D.C. path to the junction of resistances 26 and 27, while the control grid 33 is grounded.

A third amplifier stage 35 employs a pentode tube 36 as a voltage amplifier. The pentode tube 36 includes, in the order named, an anode 37, a suppressor grid 38, a screen grid 39, a control grid 40 and a cathode 41. The anode 37 is connected to a B+ terminal 44 via two series connected resistances 45 and 46, the latter being shunted by a peaking coil 47. The B+ terminal is further connected to screen grid 39 via a voltage dropping resistance 48, and is by-passed to ground by a large filter capacitor 49. The suppressor grid 38 is connected directly to cathode 41, and the latter is connected to ground through a self-bias circuit comprising a bias resistance 50 and a shunting filter capacitor 51.

The anode 32 of triode 31 is connected directly, via a D.C. path of negligible impedance, to the control grid 40 of pentode 36. The anode 32 of triode 31 is further connected via a peaking coil 52 and a load resistance 53, in series with each other, to the cathode 41 of pentode 36.

The anode 37 of pentode 36 is coupled through a coupling capacitor 54 to the control grid of a cathode ray tube (not shown) or to some other appropriate driven device.

In operation, the detector stage derives video signal from a video modulated carrier, in conventional fashion, supplying same as drive signal to the cathode follower stage 18. The cathode load resistance 27 pertaining to cathode follower stage 18 drives the grounded grid amplifier stage 30. The anode of the latter utilizes as its source of anode voltage the D.C. bias voltage developed at the cathode 41 of pentode 36, and employs an anode load consisting of resistance 53 and peaking coil 52 in series. The anode 32 of the grounded grid amplifier stage supplies drive signal over a D.C. impedance-free path to the control grid 40 of pentode 36, and operates at a D.C. level sufficiently below that of the cathode 41 that a suitable negative bias potential exists between control grid 40 and cathode 41.

Since the triode 31 is connected as a grounded grid amplifier, positive feedback from output to input circuit is eliminated, the Miller effect common in triode amplifier stages is not present, and no polarity change exists between drive and output signals. D.C. coupling is employed between the cathode 20 of pentode 19 and the control grid 40 of pentode 36, so that low frequency response is not degenerated, and only a single phase reversal occurs in the three stages of amplification, i.e., the system operates, with respect to phase reversals, like a single stage amplifier, and avoids coupling capacities, whether in coupling circuits or by Miller effect.

Since the input impedance of a grounded grid amplifier is low, matching to the cathode follower load resistance 27 is entirely feasible, while by employing a relatively high load impedance for triode 31 voltage and power gain is available in stage 30.

The present system, accordingly, has an extremely wide band response, ranging from approximately D.C. to the V.H.F. region, and possesses high gain. The first amplifier stage 18 presents a high impedance to the detector stage 12, which permits high detection efficiency, and thereby a major increase in overall gain of the system, while the fact that only a single phase reversal occurs overall renders the amplifier inherently stable over a wide band.

Output signal may be derived from the anodes of pentodes 19 and 36, these outputs having each a relatively high level and being co-phasal. The amplifier thereby possesses utility for driving slaved displays, of which a local display may be supplied with signal from the anode of pentode 19, while a remote display may be supplied with signal from the anode of pentode 36. In such case the stages 30 and 35 may be remotely located and coupled through a cable extending from the junction of resistances 26, 27 to the cathode 34 of triode 31, and may be jointly subjected to contrast control by variation of resistance 26.

Referring now more particularly to FIGURE 2 of the accompanying drawings, the reference numerals 60, 61, and 62 denote, respectively, the first, second and third cascaded stages of a transistorized amplifier which follows generally, in its mode of operation, the principles of the system of FIGURE. 1.

The stage 60 comprises a PNP transistor 64, having a base 65, an emitter 66 and a collector 67. The collector 67 is connected to the base 65 by means of a bias setting resistance 68. The emitter 66 is connected to a ground or reference point 69 via a relatively large variable resistor 79 and a relatively small load resistance 70. Adjustment of the relatively large resistor 79 provides contrast control where the system of the invention is utilized for supplying signal potential to the grid of a cathode-ray tube. The collector 67 is connected via a suitable load impedance 71 to the negative terminal 72, of a suitable voltage source 73, the positive terminal 74 of which is connected to the reference point 69. A filter condenser 75 extends from the terminal 72 to the reference point 69, and a coupling condenser 76 couples a signal input terminal 77 to the base 65.

The first stage of the amplifier operates with both a collector load and an emitter load, the base electrode being driven. The load impedance 71 enables output voltage to be derived for application via a capacitor 78 to the grid of a cathode-ray tube or other utilization device (not illustrated).

The second stage 61 includes a PNP transistor 80, having a base electrode 81, an emitter electrode 82 and a collector electrode 83. The emitter electrode 82 is connected via a D.C. path of negligible impedance to the emitter electrode 66. The base electrode 81 is connected to the collector electrode 83 by means of a bias setting resistance 84, and is further coupled to reference point 69 by means of a filter condenser 85.

The third stage 62 includes a transistor 90, having a base electrode 91, an emitter electrode 92, and a collector electrode 93. A bias setting resistance 94 is connected between collector electrode 93 and base electrode 91. A filter condenser 95 couples the emitter electrode 92 to reference point 69. A load impedance comprising a load resistance 96 and a peaking coil 97 are connected in series between emitter electrode 92 and collector electrode 83, and a load impedance comprising series connected resistances 98 and 99 is connected between the negative terminal 72 of voltage source 73 and the collector electrode 93. Output signal may be derived from collector electrode 93 through a coupling condenser 100 or an output lead 101, the resistance 99 being shunted by a peaking coil 102.

The first stage, 60, operates analogously to a cathode loaded grid driven vacuum tube amplifier, in respect to the cascaded stages, having a high input impedance and relatively low output impedance, and no phase reversal between input and output signals.

The second stage, 61, of the amplifier of FIGURE 2 operates analogously to a grounded grid, cathode driven vacuum tube amplifier, while the third stage, 62, operates analogously to a plate loaded grid driven vacuum tube amplifier.

A single voltage source is utilized to energize and bias all three stages. A D.C. path for the second and third stages can be traced from terminal 74 through load resistance 70, from emitter electrode 82 to collector electrode 83 of transistor 80, through load resistance 96 and peaking coil 97 to emitter electrode 92 of transistor 90, to collector electrode 93 and thence via output load resistances 99 and 98 to the negative terminal 72 of power source 73.

The stage 61 does not introduce a phase reversal of signal, since its load is in the collector circuit of transistor 80 and its driving source in the emitter circuit, but this stage does have voltage and power gain, providing relatively high amplitude driving signal for stage three. The latter is, per se, a high gain stage, providing a phase reversal of signal.

The amplifier, accordingly, provides a single phase reversal between input and output terminals, and presents a high input impedance and a high power gain, of the order of 60 db. Its frequency response extends into the V.H.F. region, with excellent fidelity from essentially D.C. to about 50 mc.

By reason of the high input impedance of the amplifier, sufficiently low loading is presented to signal source, such as a detector, so that high detection efficiency results, which in turn contributes to the overall efficiency of a system incorporating the amplifier of FIGURE 2.

The amplifier is inherently stable over the band of frequencies specified because only a single phase reversal takes place therein, i.e., in stage 62, this stage being effectively isolated from the first stage 60 by the intervening stage 61. The gain of the amplifier is maintained high because the intervening or second stage 61 provides gain, is capable of efficient operation from its relatively low impedance driving source and presents a high impedance to the output stage 62. Impedance matching exists, accordingly, at every point of the amplifier, despite the fact that input impedance is high, that only a single phase reversal occurs, and that two gain providing stages are included in the amplifier.

It is moreover, feasible to derive two co-phasal output signals from the amplifier at sufficiently high level to drive the control grids of cathode ray tubes (not illustrated) or other utilization devices. Where the utilization devices are cathode ray devices one of the latter may be remotely located, together with the second and third amplifier stages, whereby staged displays are provided which may be controlled from a single control devices, remotely located.

Moreover, while there are shown amplifiers for supplying only two co-phasal video signals, it will be understood that any number of co-phasal amplifiers may be provided. For example, in FIGURE 1 any number of additional amplifiers, including the components of stages such as 30 and 35, may also be connected to the junction of resistors 26 and 27, and in FIGURE 2 any number of additional amplifiers, including the components of stages such as 80 and 90, may be connected to the junction of resistors 70 and 79.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. A signal amplifier including a first stage, a second stage and a third stage, said first stage being a cathode follower stage having a cathode load connected to a point of reference potential, said second stage being a cathode driven stage including a vacuum tube having a first cathode connected to a point of said cathode load, said vacuum tube further including a first anode and a first control grid, said first control grid being connected via a path of negligible impedance to said point of reference potential, said third stage including a further vacuum tube having a further andoe, cathode and control grid, a B+ terminal, an anode load connected between said further anode and said B+ terminal, a self-bias circuit by-passed for frequency of said signal connected between said further cathode and said point of reference potential, another load for said second stage providing a path for direct current, said another load being directly connected between said first anode and said further cathode, and a direct connection betwen said first anode and said further grid, a D.C. path existing from said B+ terminal via said further anode to said further cathode and thence through said another load to said first anode and from said first anode to said first cathode and from said first cathode via said cathode load to said point of reference potential.

2. An amplifier, comprising a signal source having a low impedance, a first amplifier stage comprising a first vacuum tube having a first anode, cathode and control grid, a second vacuum tube having a second anode, cathode and control grid, a source of B+ voltage, a series D.C. circuit including in series said source of voltage, the internal anode to cathode path of said second vacuum tube, the internal anode to cathode path of said first tube and said signal source, a load for said first vacuum tube connected directly between said first anode and second cathode and providing a D.C. path and included in said series D.C. circuit, and means connecting said load in driving relation to said second control grid and said second cathode, said first control grid being connected to a point of reference potential and said first cathode being connected in driven relation to said signal source.

3. The combination according to claim 2, wherein said load circuit is connected in series with said first anode, and wherein said second cathode and second control grid are connected across at least part of said load.

4. The combination according to claim 3, wherein is further provided a load connected in series with said second anode.

5. An amplifier including a first stage, means for deriving high level output signal of predetermined phase from said first stage, a cathode load for said first stage, a second stage, said second stage being a cathode driven stage including a first vacuum tube having a first cathode connected via a D.C. path to a point of said cathode load, said first vacuum tube further including a first anode and a first control grid, said first control grid being connected directly to a point of reference potential, a third stage said third stage including a further anode, cathode and control grid, a B+ terminal, an anode load connected between said further anode and said B+ terminal, a self-bias circuit connected between said further cathode and said point of reference potential, another load directly connected between said first anode and said further cathode, a direct connection betwen said first anode and said further grid, and means for deriving a further high level output signal of said predetermined phase from said third stage.

6. The amplifier of claim 5 wherein said cathode load for said first stage includes a variable voltage divider having a tap corresponding to said point of said cathode load.

7. A video amplifier comprising a video signal source having low impedance, a first amplifying element having first, second and third electrodes, a point of common potential, lead means for connecting said source between said point and said first electrode, said second electrode being directly connected to said point, a high frequency amplifier stage including a second amplifying element having fourth, fifth and sixth electrodes, said first and fourth electrodes being capable of emitting charged carriers, a passive biasing network connected between said fourth electrode and said point, said third and fifth electrodes being directly connected together, terminal means for connecting said sixth electrode with a supply of direct current, a high frequency peaking network connected between said third and fourth electrodes, a path for direct current between said fourth electrode and said signal source including said peaking network, said lead means, and the internal impedance of said first amplifying element between said first and third electrodes.

8. A video amplifier comprising a video band signal source of low impedance, a vacuum tube having a first anode, a first cathode, and a first control grid connected to ground lead means for connecting said source to said first cathode, a high frequency amplifier stage including a second tube having a second anode, second cathode and a second control grid, said second control grid and said first anode being connected directly together, terminal means for connecting said second anode with a source of direct current, a passive biasing circuit connected to said second cathode, a high frequency peaking network connected between said first anode and said second cathode, a path for direct current between said second cathode and said signal source including said peaking network and said lead means.

9. The amplifier of claim 8 wherein said signal source includes a third tube having a third cathode, and a variable voltage divider connected to said third cathode, said voltage divider having a tap connected directly to said first cathode.

References Cited in the file of this patent

UNITED STATES PATENTS

| | | |
|---|---|---|
| 2,208,254 | Geohegan | July 16, 1940 |
| 2,289,301 | Barber | July 7, 1942 |
| 2,618,711 | Bourget | Nov. 18, 1952 |
| 2,668,881 | Crosby | Feb. 9, 1954 |
| 2,721,908 | Moe | Oct. 25, 1955 |
| 2,787,672 | Crosby | Apr. 2, 1957 |
| 2,816,179 | Gittleman et al. | Dec. 10, 1957 |
| 2,826,646 | Williams | Mar. 11, 1958 |
| 2,863,955 | Keonjian | Dec. 9, 1958 |
| 2,873,320 | Gill et al. | Feb. 10, 1959 |
| 2,912,654 | Hansen | Nov. 10, 1959 |